Aug. 10, 1965 M. JONES 3,200,391

TUBE FAILURE INDICATOR

Filed Nov. 15, 1961

Matthew Jones,
*INVENTOR.*

BY S. J. Rotondi
A. J. Dupont
Julian W. Doity

United States Patent Office 3,200,391
Patented Aug. 10, 1965

3,200,391
TUBE FAILURE INDICATOR
Matthew Jones, Co. "B" USA OGMS,
Redstone Arsenal, Ala.
Filed Nov. 15, 1961, Ser. No. 152,690
1 Claim. (Cl. 340—252)
(Granted under Title 35, U.S. Code (1952), sec. 266)

The invention described herein may be manufactured and used by or for the Government for governmental purposes without the payment of any royalty thereon.

This invention relates to a device for checking the current flow in an electric circuit and more particularly for determining whether or not the tubes or transistor of the circuit are conducting .

In the past in electronic devices such as radios and television sets when a component such as a tube or transistor weakened or burned out it has been necessary to remove every tube or transistor from the set and have them tested. This operation has proven to be time-consuming and costly. Furthermore, if the tubes tested were not burned out or weak, it was necessary to check out the entire circuit in order to determine the trouble with the device.

Accordingly, it is an object of this invention to provide a device that will supply an identifying signal for each series circuit that contains a tube, transistor, or electrical component at the instant that the components or component of the series circuit weakens or burns out.

It is a further object of the invention to provide a device that indicates whether or not an electronic component such as a tube or transistor is conducting without removing the electronic component from its chassis.

This invention will be more clearly understood by referring to the accompanying drawing in which.

Figures 1, 2, 3, 4:
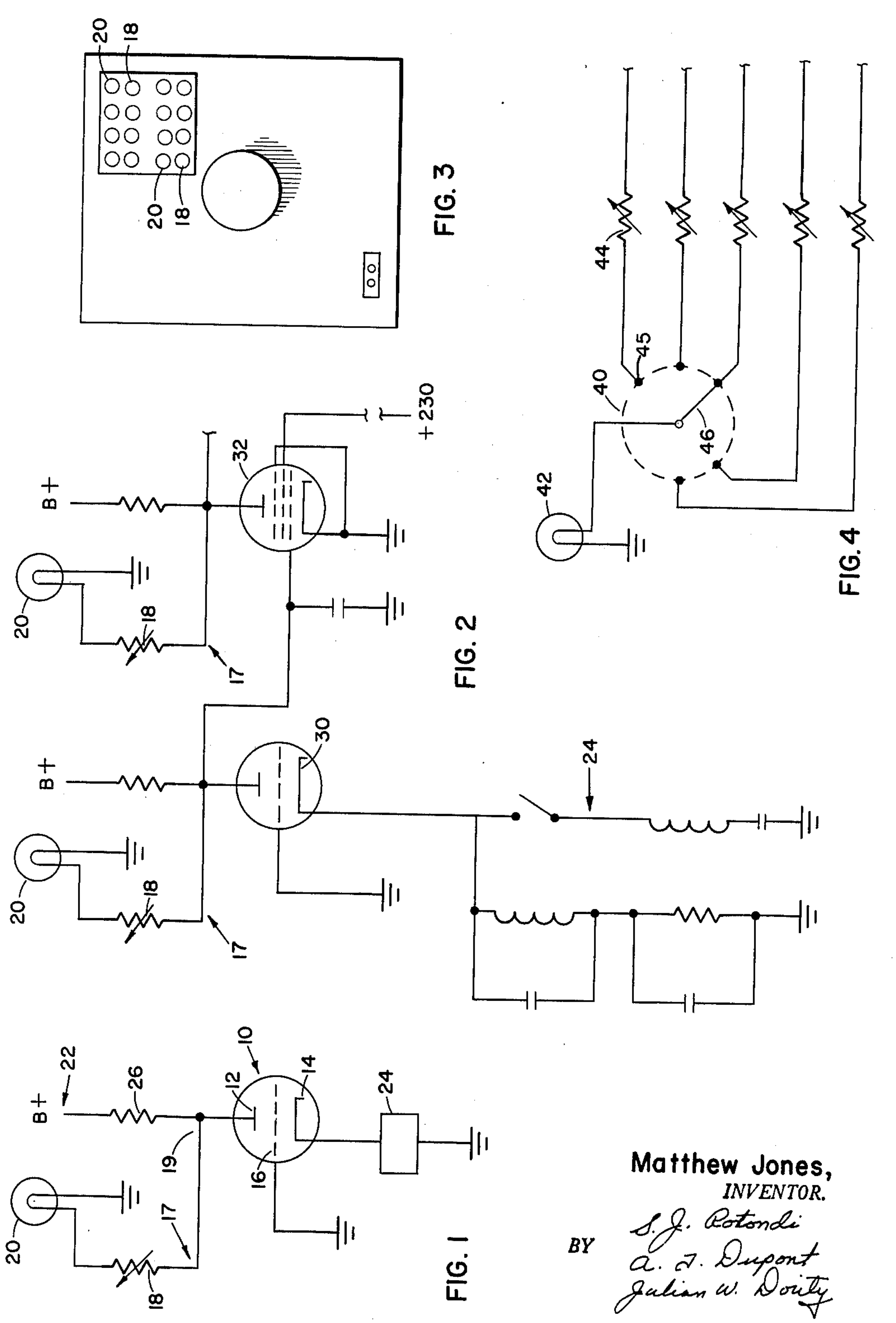
FIGURE 1 is a schematic diagram of the invention.
FIGURE 2 is a schematic diagram of the invention being used in a plurality of stages of a television circuit.
FIGURE 3 is a view of the back of a television set showing how the signal lamps and their respective variable resistors are mounted.
FIGURE 4 is a schematic diagram showing how a single signal lamp may be utilized to test the current conduction of a plurality of electronic components.

In accordance with the invention, a signal circuit is connected in shunt with the plate supply of an electronic device so that when the electronic device is not conducting and the plate supply is on an indicating signal will be produced by the signal circuit.

In the drawing, for purpose of illustration, there is shown a preferred embodiment of the invention for determining whether or not current is flowing through a particular series circuit. The circuit checker (FIGURE 1) comprises an electron tube 10 having a plate 12, grid 16, and a cathode 14. The plate 12 is connected to a positive potential 22 via resistor 26 while the cathode 14 is connected to ground via conventional circuitry 24 as shown in block diagram in FIGURE 1 and schematically in FIGURE 2. The grid 16 of the tube is also grounded. One end 19 of an indicating circuit 17 which comprises a variable resistor 18 and a signal lamp 20, is connected between the positive potential 22 and the plate 12. In order to complete the indicating circuit its other end is connected to ground.

The operation of this invention is as follows:

The device is connected in a circuit having electrical components, such as tubes or transistors (FIGURE 1), to be checked. When the device is connected in a circuit, which is operating normally, variable resistor 18 is adjusted until current flow through lamp 20 is insufficient to light lamp 20. If tube 10 (FIGURE 1) should weaken or burn out, after resistor 18 is adjusted, lamp 20 will receive enough current, so as to either light it brightly or dimly depending on the condition of the tube. When the tube weakens, it begins to conduct less current which will cause the plate voltage to rise and the lamp 20 to burn dimly. However, if the tube burns out completely, or if the circuitry in box 24, which can be inductors or resistors, provides an open circuit, all of the current flow provided by the potential source 22 will flow through lamp 20 and it will burn brightly.

When the indicating circuit is connected in a plurality of tube stages of a conventional television circuit (FIGURE 2) and the variable resistors 18 have been set, if either of the tubes 30 or 32 burns out or weakens, its respective indicating lamp will come on brightly or dimly according to whether the tubes burn out or weaken. If any of the circuitry that is in series with the tubes provides an open circuit its respective lamp will burn brightly since all of the current flow from the positive potential will be through the lamp.

FIGURE 4 is a modification of the device of FIGURE 1 which eliminates the need of using a lamp for each tube stage of an electronic circuit. In this embodiment a single lamp 42 is used and a multi-contact switch 40 having a plurality of contacts 45 and a switch arm 46 which connects lamp 42 to the individual tube stages. Each tube stage has its respective variable resistor 44 connected into the circuit in the same manner as shown in FIGURES 1 and 2.

The operation of this embodiment is as follows:

The device is connected to a circuit as described supra. When the multicontact switch 40 is rotated, each tube stage and its respective variable resistor 44 is connected with the lamp circuit. If lamp 42 lights, this indicates that the tube circuit connected, by switch 40, is not oper ating properly as explained in the operation of FIGURE 1.

This invention is not limited to use with tubes or transistors, and can be used to determine if proper conduction in taking place in any series circuit.

I claim:

A multistage circuit checker comprising: a plurality of amplification stages, each stage having a tube having an anode and a cathode and a voltage dropping means; a positive potential source; one side of each voltage dropping means being connected to said anodes forming junctions therebetween; another side of each of said voltage dropping means being connected to the positive potential source; network means for connecting said cathodes to a potential source negative with respect to said positive potential source; a plurality of series circuits, each having a variable resistor, a first end of each of said series circuits connected to a junction of a respective one of said stages; a multicontact switch having contacts attached to the other ends of said series circuits; and a signal lamp connected between a switch arm of the multicontact switch and said negative source; and each of said variable resistors being adjusted to a value close to but higher than a value which will allow the signal lamp to light, when placed in circuit by the multicontact switch, during normal operation of the amplification stage, whereby, upon normal current flow in each of said stages the signal lamp will not light, when placed in circuit by the multicontact switch, and upon a lower than normal current flow in one of the stages said signal lamp will light, when placed in circuit by the multicontact switch.

References Cited by the Examiner

UNITED STATES PATENTS

| | | | |
|---|---|---|---|
| 2,149,829 | 3/39 | Beers | 340—248 |
| 2,345,042 | 3/44 | Frundt et al. | 340—251 |
| 2,409,885 | 10/46 | Monori et al. | 340—255 |
| 2,623,099 | 12/52 | Wallace et al. | 340—250 |
| 2,808,457 | 10/57 | Carver | 340—253 |

NEIL C. READ, *Primary Examiner.*